United States Patent

[11] 3,604,908

[72] Inventors Raymond G. Loome
Phoenix;
Harry Miller, Scottsdale; Robert H. Parker, Phoenix, all of, Ariz.
[21] Appl. No. 825,590
[22] Filed May 19, 1969
[45] Patented Sept. 14, 1971
[73] Assignee Sperry Rand Corporation

[54] LANDING CONTROL SYSTEM FOR AIRCRAFT
6 Claims, 9 Drawing Figs.
[52] U.S. Cl. .............................................. 235/150.22, 244/77
[51] Int. Cl. ...................................................... G06g 7/78, B64c 19/00
[50] Field of Search ............................... 235/150.22; 244/77

[56] References Cited
UNITED STATES PATENTS
3,333,795  8/1967  Hattendorf et al. ........... 235/150.22 X
3,437,292  4/1969  Greene ........................ 244/77
3,447,765  6/1969  Doniger et al. ............... 244/77

Primary Examiner—Malcolm A. Morrison
Assistant Examiner—Edward J. Wise
Attorney—S. C. Yeaton ABSTRACT: An improved automatic landing control system for aircraft in which the automatic control system flarepath control law parameters includes a normally fixed bias term for establishing a nominal descent rate of the aircraft at touchdown, as well as a term which determines the shape or curvature of the flarepath. Accurate and automatic control of craft airspeed in accordance with a reference airspeed is provided. The dispersion of the touchdown point along the runway caused by uncontrollable variable errors (such as errors in measuring absolute altitude, errors resulting from aircraft displacement from the glide slope beam at flare initiation, headwinds or tailwinds, and windshear) is greatly reduced by varying, during the glide slope controlled approach and prior to flare initiation, the nominal touchdown bias term as a function of the reference airspeed of the aircraft, or alternatively, to vary the flare time constant or path curvature term as a function of airmass flightpath angle and the touchdown bias term as a function of both flightpath angle and reference airspeed.

INVENTORS
RAYMOND G. LOOME
HARRY MILLER
ROBERT H. PARKER
ATTORNEY

INVENTORS
RAYMOND G. LOOME
HARRY MILLER
ROBERT H. PARKER
BY
ATTORNEY

INVENTORS
RAYMOND G. LOOME
HARRY MILLER
ROBERT H. PARKER

LANDING CONTROL SYSTEM FOR AIRCRAFT

BACKGROUND OF THE INVENTION

The present invention relates generally to automatic flight control systems and more particularly to apparatus for automatically controlling an aircraft from the glide slope control phase through the flare and touchdown phase of the landing maneuver. As used in the following, the terms pitch automatic flight control, pitch automatic pilot, etc. will be used in the broadest sense and will be understood to include not only a fully automatic flight control system, but also to include the manual control of the craft pitch attitude or flightpath through visual reference to a flight director indicator which commands the pilot to fly the craft in accordance with the signal commands supplied to the indicator.

The ultimate goal of any automatic landing system is to land the aircraft safely and smoothly on the runway within particular geometric and aircraft attitude dynamic boundaries. This automatic control may be restricted by the performance capabilities of various aircraft automatic control subsystems, such as pitch attitude and speed control subsystems, and under certain uncontrollable environmental conditions, such as errors in measuring absolute altitude, errors resulting from aircraft displacement from the glide slope beam at flare indication, headwinds and tailwinds and windshear. It is required in an automatic landing control system that the touchdown dispersion, that is, the spread of touchdown points along the runway relative to a predetermined point, such as the intersection of the nominal flare control defined flightpath with the runway, be kept within predetermined confines. Such a requirement imposes a heavy burden on the capabilities of the automatic flight control system such as sensor, electronics, servosystem tolerances, etc. Thus, if the basic, or nominal, control law parameters which determine the flarepath characteristics are varied or adjusted in accordance with existing and detectable approach conditions, the touchdown dispersion can be significantly reduced and, therefore, the tolerances on the flight control system may be less severe and still provide automatic control to touchdown within required dispersion limits.

It has been determined that accurate thrust or airspeed control is of primary importance during an automatic approach to landing and that this airspeed control must be coordinated with the automatic flare control system; i.e., the pitch attitude flight control system employed prior to and after flare initiation. Such accurate thrust control can only be accomplished through an automatic airspeed control system. At the predetermined flare initiation point, the nominal touchdown point is a function of glide slope angle and craft airspeed, while the effect of each of these factors on touchdown dispersion depends upon the flare control law employed, its implementation and airframe characteristics and configuration.

SUMMARY OF THE INVENTION

The automatic landing control system of the present invention involves two subsystems, an automatic pitch attitude control subsystem wherein pitch attitude and hence the flightpath is controlled in accordance with a flare control computer, the output of which represents the solution of a flare control law of the form $J\dot{h}+h+L=0$ where $J$ = Nominal flare time constant
$h$ = Absolute altitude
$L$ = Nominal touchdown bias and an automatic throttle or thrust control subsystem wherein the airspeed of the craft is accurately controlled in accordance with a control law of the form $V_{REF}-V=0$ where $V$ = Actual airspeed of the aircraft
$V_{REF}$ = A required reference airspeed In the present invention, the reference airspeed is automatically computed from measures of aircraft weight and flap position which in turn are derived from measured of angle of attack, flap position, airspeed, bank angle, etc. as taught in assignee's copending patent application Ser. No. 699,638 filed on Jan. 22, 1968 in the name of H. Miller. Alternatively, however, it will be understood that the reference airspeed may be manually set from the aircraft manufacturers' "book values" based on estimated craft landing weight. The automatic flight control system of which the flare computer subsystem may be an integral part may be of the character shown in U.S. Pat. No. 2,998,946 assigned to the same assignee as the present invention.

In accordance with the teachings of the present invention, the touchdown dispersion is considerably reduced by varying, during the glide slope control phase of the approach, the touchdown bias term $L$ as a function of the reference airspeed established for the aircraft. In a modification of the present invention the flare control law time constant $J$ is varied as a function of airmass flightpath angle of the aircraft and touchdown bias $L$ is varied as a function of flightpath angle and airspeed. It should be noted that in the latter case the flightpath angle measure is preferably derived from air data information; i.e., with respect to the supporting airmass, in accordance with the conventional relation:

$$\sin \gamma = \frac{\dot{h}}{V} \quad \gamma = \sin^{-1} \frac{\dot{h}}{V}$$

but wherein $V$ is the reference airspeed $V_{REF}$.

As the description of the preferred embodiment of the present invention proceeds, the effect of the variation of the control law parameters on touchdown dispersion will be described and various flarepath trajectories under different conditions will be discussed.

DETAILED DESCRIPTION OF THE PREFERRED EMBODIMENTS

Figure 1:
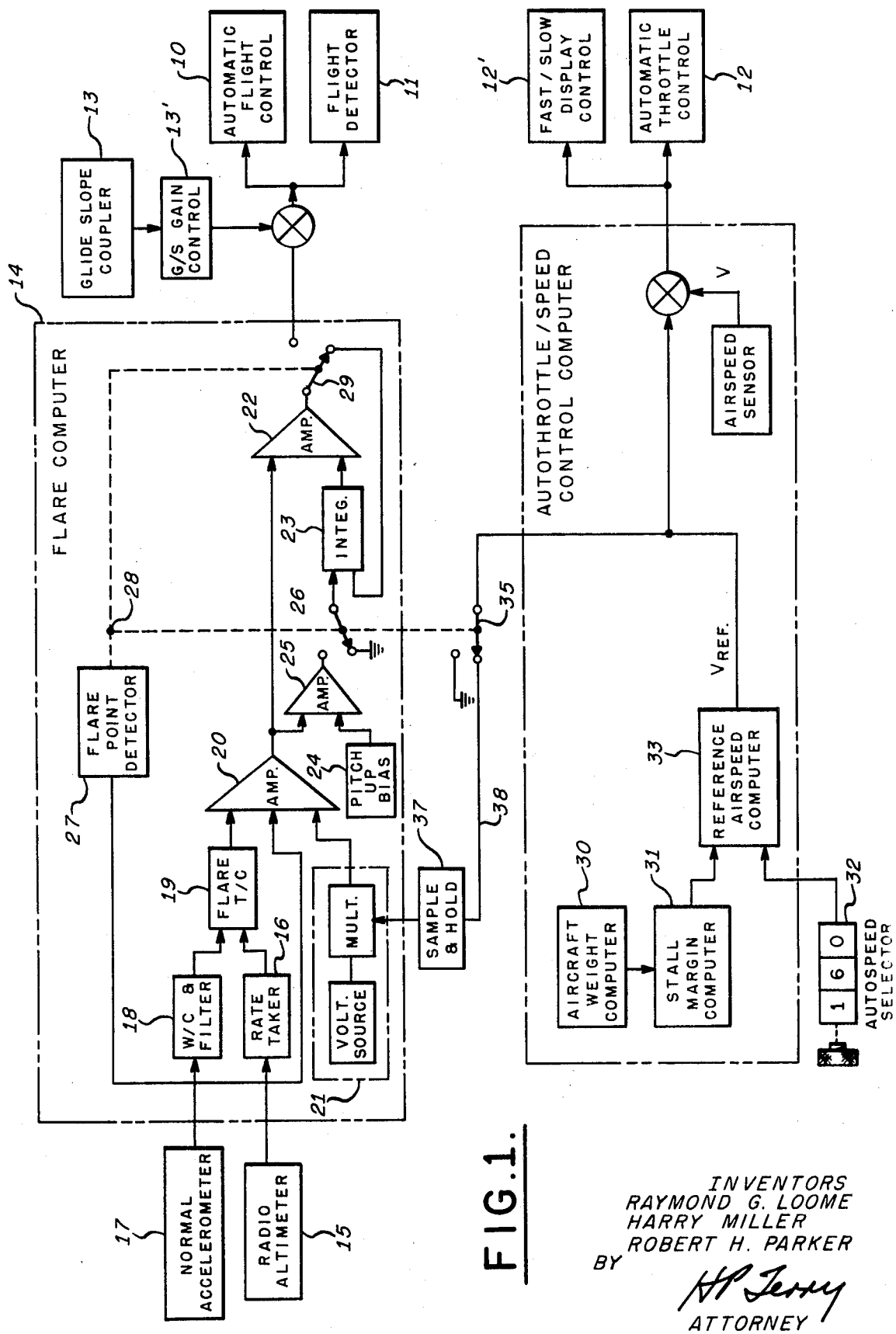
FIG. 1 illustrates in block diagram form one embodiment of the present invention.

In accordance with the teachings of the present invention, two aircraft control subsystems are involved, (a) an automatic pilot system 10 for controlling the aircraft pitch attitude and longitudinal flightpath in accordance with a pitch surface command signal, or alternatively a flight director system 11 wherein the pilot may manually control the longitudinal flightpath through pitch commands presented to him through a flight director indicator, and (b) an automatic throttle control system 12 for automatically controlling the airspeed of the craft in accordance with a reference airspeed. The automatic flight control system 10 may be of the type illustrated in applicants assignee's U.S. Pat. No. 2,988,946 while the flight director indicator system 11 may be of the type shown in applicants assignee's U.S. Pat. No. 2,613,352. Also, the automatic throttle control and display system 12 may be that illustrated in applicants assignee's U.S. Pat. No. 2,888,219, but more specifically may be of the type disclosed in the abovementioned copending application Ser. No. 699,638. The system of the present invention is operative during the ILS glide slope approach mode and, as is well known in the art, the autopilot 10 (or flight director 11) controls the aircraft pitch attitude to maintain the craft flightpath coincident with the glide slope beam of the ILS system through glide slope coupler equipment 13 and gain control unit 13' which is normally part of the flight control system. More specifically, the glide slope coupler 13 may be of the type illustrated in applicants assingee's U.S. Pat. No. 3,381,295.

As shown in this latter patent, the gain of the glide slope displacement signal to the autopilot is varied substantially linearly as a function of absolute altitude for the purpose of maintaining a substantially uniform elevator response to glide slope error as the aircraft approaches a glide slope transmitter. At a predetermined altitude, say about 100 feet, the gain of the glide slope error signal to the autopilot is smoothly and linearly reduced so that when the aircraft reaches the nominal flare control initiation point, about 30 to 50 feet, the gain of the glide slope signal is zero. The aircraft control is then automatically and smoothly switched from the glide slope coupler 13 to the output of a flare computer 14 for controlling the longitudinal flightpath of the aircraft to touchdown.

During the glide slope approach phase in the automatic landing, it is imperative that the aircraft airspeed is precisely controlled to a reference airspeed which is preferably a predetermined speed above stall speed which is referred to herein as $V_{MIN}$. The reason for this is that the autoland glide slope tracking and flare control laws are based upon a nonvarying airspeed. The complexity and response characteristics of airspeed control in an aircraft require that this speed control be completely automatic. As shown in FIG. 1, the stall margin computation by computer 31 is based on a measure of aircraft weight, as derived from weight computer 30, and aircraft lift characteristics as determined by flap position, etc. whereby its output is in terms of airspeed. The $V_{MIN}$ computer output is supplied to reference airspeed computer 33 which computes the airspeed reference $V_{REF}$ required to maintain a predetermined minimum speed above stall. Alternatively, it will be recognized that the pilot, using "book" values of $V_{MIN}$ provided by the aircraft manufacturer corresponding to an estimated aircraft weight, may manually set the reference airspeed. This is illustrated in FIG. 1 schematically by means of airspeed selector 32. The actual reference airspeed signal, whether computed automatically through weight computer 30 and stall margin computer 31, or inserted manually, is supplied as a command signal to the autothrottle control system 12 which, in turn, maintains the actual airspeed equal to the reference airspeed. The apparatus for computing reference airspeed may, as stated above, be of the type illustrated in detail in the above-mentioned patent application.

In the illustrated embodiment of the present invention the flare computer 14 controls the aircraft flightpath in accordance with the solution of the above defined control law $J\ddot{h}+\dot{h}+L=0$ which will be recognized as an exponential or asymptotic curve. As illustrated in FIG. 1, the variable terms $\dot{h}$ and $h$ are derived from radio altimeter 15, rate taker 16, normal accelerometer 17 and washout and filter networks 18. The radio altimeter 15 detects directly the absolute altitude of the craft above the runway and constitutes the variable displacement term of the above control law. The altitude rate term is derived from two sources; the rate taking network 16 responsive to the radio altimeter 15 which provides the desired low frequency components of altitude rate and a vertical accelerometer 17 which, through washout and filter network 18, provides the desirable high frequency components of vertical rate whereby to provide a complemented radio rate term having frequency components consistent with the aircraft control characteristics. The outputs of rate taker 16 and washout and filter circuit 18 are combined in a suitable summing circuit 19, the gain of which is set in accordance with a predetermined value of the constant $J$ of the flare control law. Parameter $J$ determines the time constant or curvature of the flarepath. The altitude rate term and altitude displacement term are combined in a suitable summing amplifier 20. The constant $L$ of the above flare control law determines the touchdown bias of the aircraft and actually represents a reference runway surface which is below the actual runway surface by a finite distance, that is, the constant $L$ determines the asymptote of the control law curve. This term, therefore, really defines a finite touchdown rate of descent. Flare computer 14 provides this touchdown bias from a suitable bias network 21 to be hereinafter more fully described below. The output of bias network 21 is also summed with the $h$ and $J\dot{h}$ terms in amplifier 20 whereby to provide at its output a signal which is a measure of the solution of the flare control law; i.e., a finite signal represents a corresponding error in the solution of the equation. The output of amplifier 20 is applied to coupler output amplifier 22.

Prior to flare initiation, the output of amplifier 22 is maintained substantially zero so that upon flare initiation no transient is inserted into the autopilot pitch channel. This is accomplished in a conventional manner by coupling the output of amplifier 22 back to its input through an integrator circuit 23. Also, after flare initiation, it is desirable due to the relatively short term of the flare maneuver, and the inertia of the aircraft, to force the nose of the craft up in open-loop fashion. This may be accomplished by supplying a fixed magnitude "pitch up" bias signal from source 24 upon flare initiation to assure a positive buildup of signal at the output of integrator 23. The control law error from amplifier 20 is also supplied to integrator 23 through amplifier 25 and switch 26 for conventional integral control purposes. This arrangement assures a positive pitchup maneuver which will assist the craft in following the flare control law flightpath.

As stated above, it is usually desirable from the human pilot's point of view that the flare initiation point always occur at substantially the same absolute altitude. For this purpose flare computer 14 includes a flare point detector 27 which is directly responsive to the output of altimeter 15. This may be a conventional signal level detector circuit which provides either an electrical or mechanical output 28 when the radio altitude decreases to a predetermined value, which for example may be between 30 and 50 feet above the runway. Since this is a desired prerequisite, it is the purpose of the present invention to reduce the extensive touchdown dispersion imposed thereby due to those uncontrollable factors mentioned above. However, it will be understood that the flare initiation point may be determined by the solution of the above flare control law going to zero as the curves of FIG. 4 through 8 illustrate. Operation of flare detector 27 places the flare computer command of the pitch autopilot 10 and/or flight director 11 by closing switches 29 and 26.

In accordance with the teachings of the present invention, the desirable flarepath characteristics; i.e., the values of the control law parameters, are continuously determined and adjusted during the glide slope approach and prior to flare initiation in accordance with determinable existing conditions. At flare initiation, however, variation of these parameters is ceased and are thereafter maintained fixed at their then obtaining value.

Figure 4:
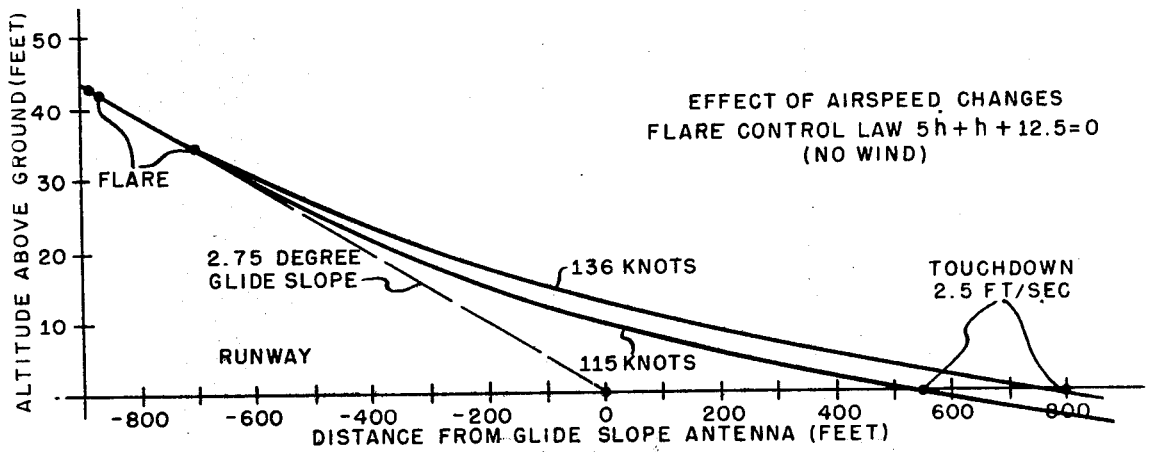
FIG. 4 is a plot of typical flarepath trajectories showing the effects of airspeed changes at flare initiation, on touchdown dispersion.
Figure 5:
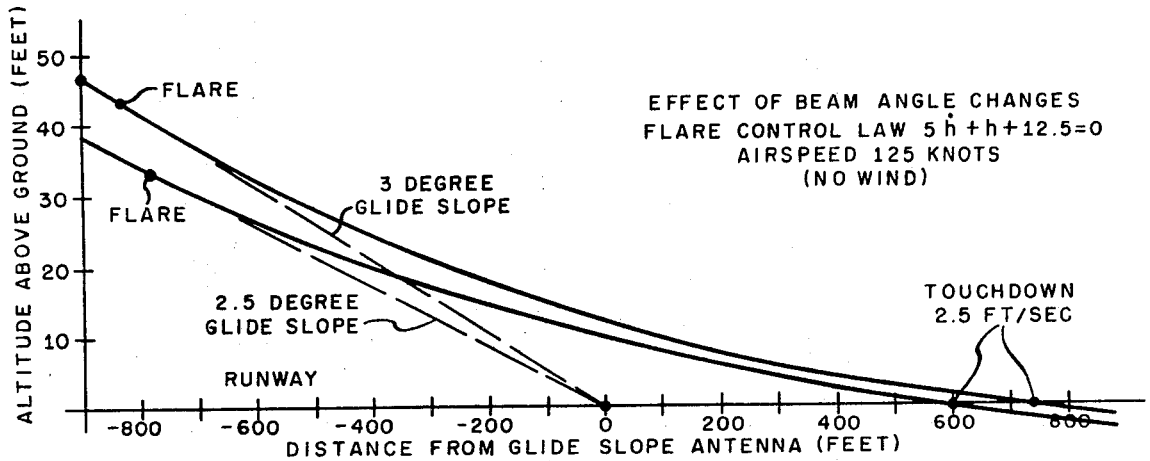
FIGS. 5 and 6 are similar plots showing the touchdown dispersion resulting from changes in glide slope angle and wind conditions.
Figure 6:
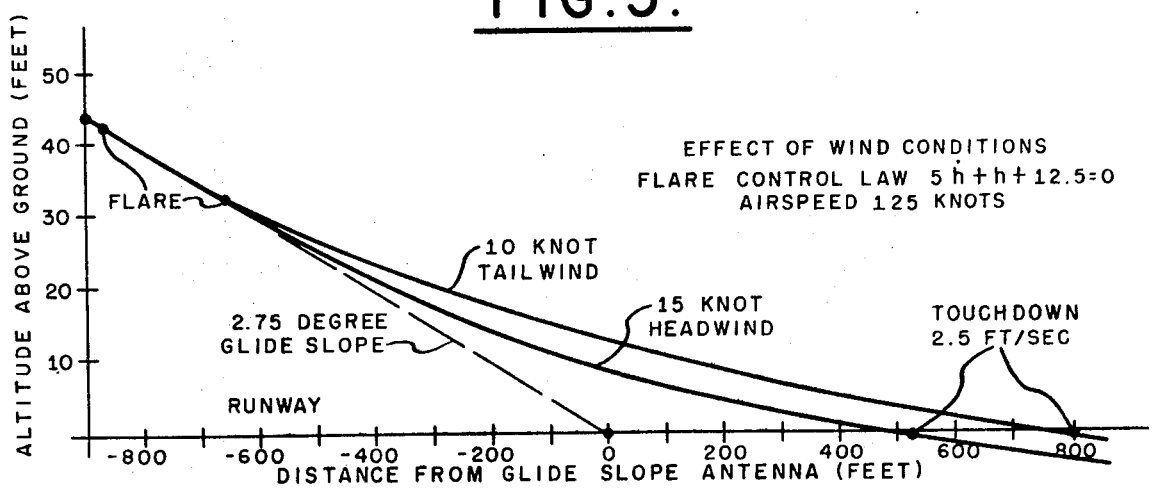

FIG. 4 illustrates typical flarepath trajectories at two different airspeeds and the touchdown dispersion resulting therefrom while FIGS. 5 and 6 illustrate typical flarepath trajectories resulting from changes in glide slope beam angles and wind conditions respectively. These trajectories are the result of forward and vertical speeds and the restraint placed upon the aircraft by reason of forced glide slope path tracking relative to the ground by the automatic pilot, these terms being also the ingredients of the long term indicated airspeed and flightpath angle of the aircraft. Thus, indicated airspeed can be used to compensate for the touchdown dispersion resulting from variations in airspeed while flightpath angle can be used to compensate for the effects of variations in the glide slope beam angle and the corresponding change in vertical speed. Furthermore, if the measure of flightpath angle is derived from air data information; i.e., flightpath angle relative to the sustaining airmass, dispersion resulting from wind variations will also be substantially reduced due again to restraints imposed by autopilot glide slope tracking.

Figure 7:
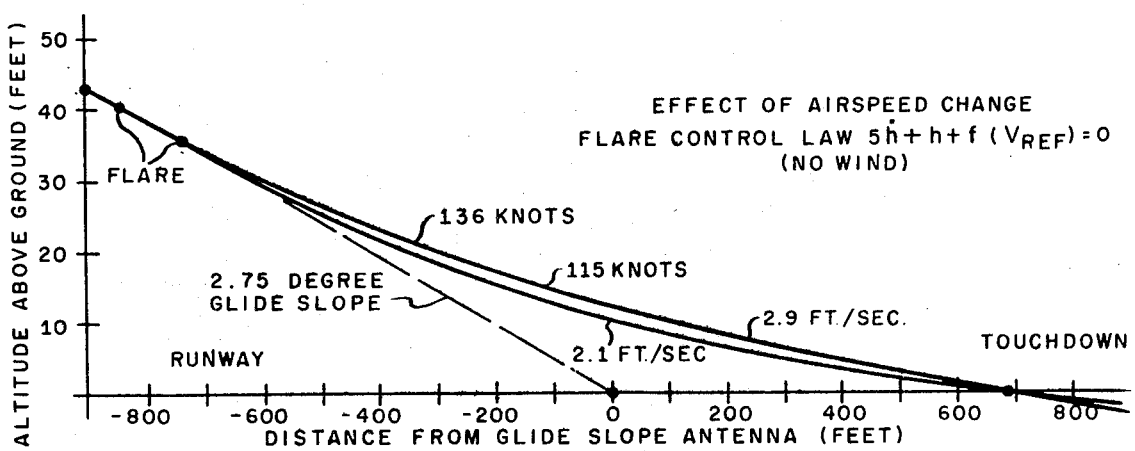
Figure 8:
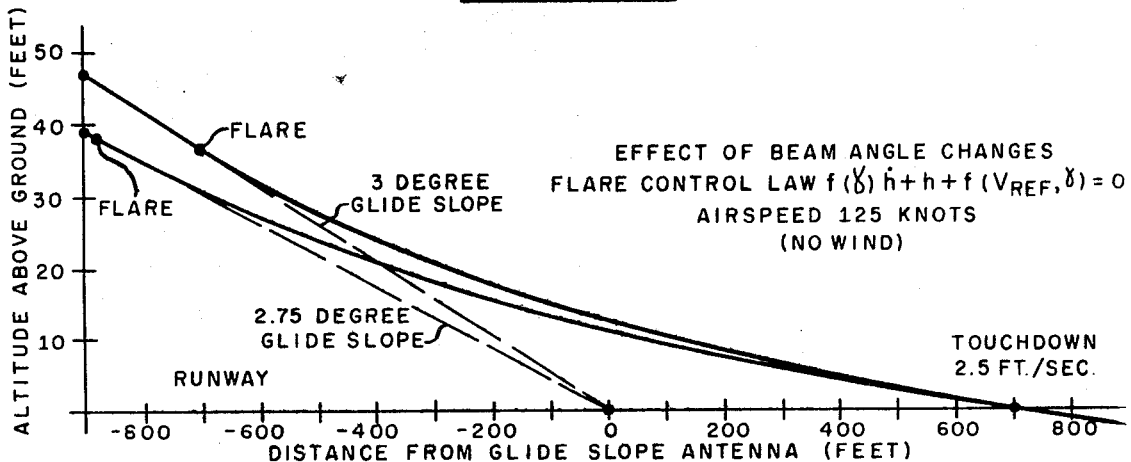
FIGS. 8 and 9 are plots of flare trajectories showing the reduced touchdown dispersion resulting from the variation of the flare control law parameters in accordance with the teachings of the present invention.
Figure 9:
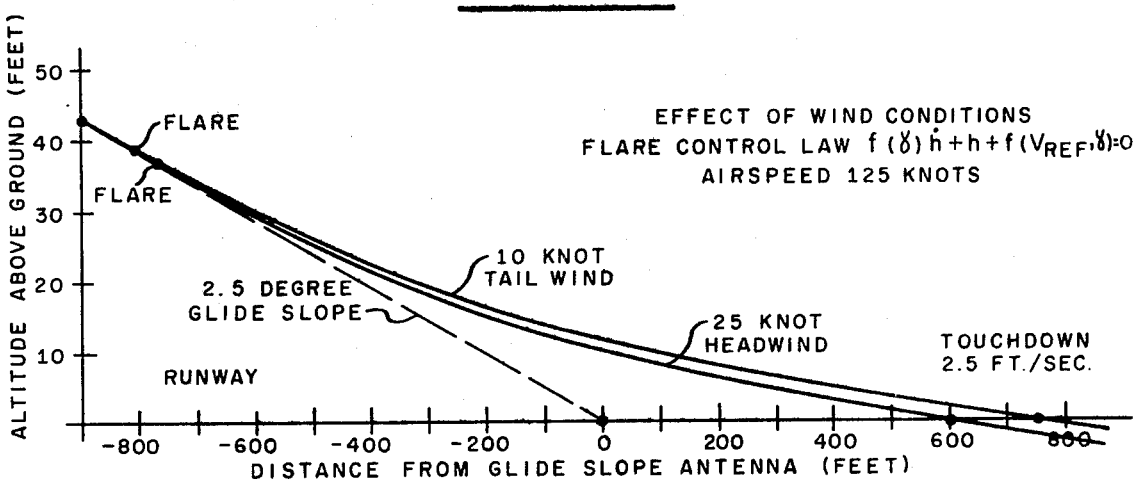

FIGS. 7, 8 and 9 are illustrations of flare trajectories in which the flare control law parameters are varied prior to flare initiation in accordance with reference airspeed and flightpath angle. FIG. 7 demonstrates that the longitudinal touchdown dispersion caused by reference airspeed changes is reduced if the touchdown bias ($L$) is varied as a function of reference airspeed. The dispersion with reference airspeed changes is reduced to zero for the nominal beam angle of 2.75° and is minimal at other beam angles. However, the dispersion at any given reference airspeed resulting from changes in glide slope beam angles and from wind conditions is still nominal as shown in FIGS. 5 and 6.

Referring again to FIG. 1, the apparatus by which the above may be accomplished is shown. The touchdown bias parameter $L$ is normally a constant representing the asymptote of the control law curve and may nominally be about 12.5 feet below the real runway, this parameter representing a touchdown bias rate of 2.5 feet/second for a nominal flare time constant of $J=5$. This bias is derived from a voltage source 36 which is applied to a variable gain device, such as multiplier 37, the output of which is supplied to summing amplifier 20. Multiplier 37 serves to vary the value of the bias signal supplied to amplifier 20 and in this embodiment of the invention this bias is varied in accordance with the aircraft reference airspeed $V_{REF}$ which is supplied to multiplier 37 by way of example and hold network 37', lead 38 and switch 35, from reference airspeed computer 33. It will be noted that switch 35 is actuated from its closed to its opened condition at flare initiation through connection 28 with the flare point detector 27. The bias and multiplier circuit 37 and sample and hold network 37' are so arranged that operation switch 35 to the open condition does not affect the value of the bias signal then obtaining.

Figure 2:
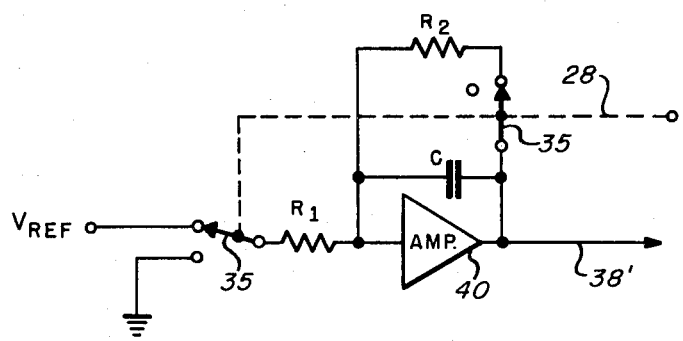
FIG. 2 is a block diagram of a modification of the embodiment illustrated in FIG. 1.

FIG. 2 illustrates schematically one form of sample and hold circuit that may be employed. Briefly, this circuit comprises an operational amplifier 40 the input of which is connected to receive the bias control voltage $V_{REF}$ on lead 38 through switch 35 and resistance $R_1$. The output of amplifier 40 is connected in feedback fashion to the input through a further switch 35', resistance $R_2$ and parallel connected capacitor C. If $R_1$ equals $R_2$, the output of 38' of amplifier 40 substantially tracks its input when switches 35 and 35' are closed and condenser C charges accordingly. Upon opening of switches 35 and 35' by flare point detector output 28 the stored charge on condenser C will feed the amplifier input and thereby tend to maintain the output 38' unchanged. The value of condenser C may be chosen so that no substantial decay will occur during the normally short time period from flare initiation to actual touchdown.

Thus, by adjusting the touchdown bias $L$ as a function of reference airspeed, $V_{REF}$, the touchdown dispersion due to variations in craft speed (under different craft weight conditions) will be greatly reduced from what it would otherwise be. This is evident from an inspection of FIG. 6.

FIG. 8 demonstrates that the dispersion caused by changes in reference airspeed and variations in glide slope path angle can be reduced to zero if the flare time constant $J$ and touchdown bias $L$ are varied as a function of flight path angle $\gamma$ and if the touchdown bias $L$ is also varied as a function of reference airspeed $V_{REF}$. FIG. 9 similarly demonstrates that the dispersion resulting from wind conditions can be reduced if the flightpath angle compensation is derived with respect to the supporting airmass.

Figure 3:
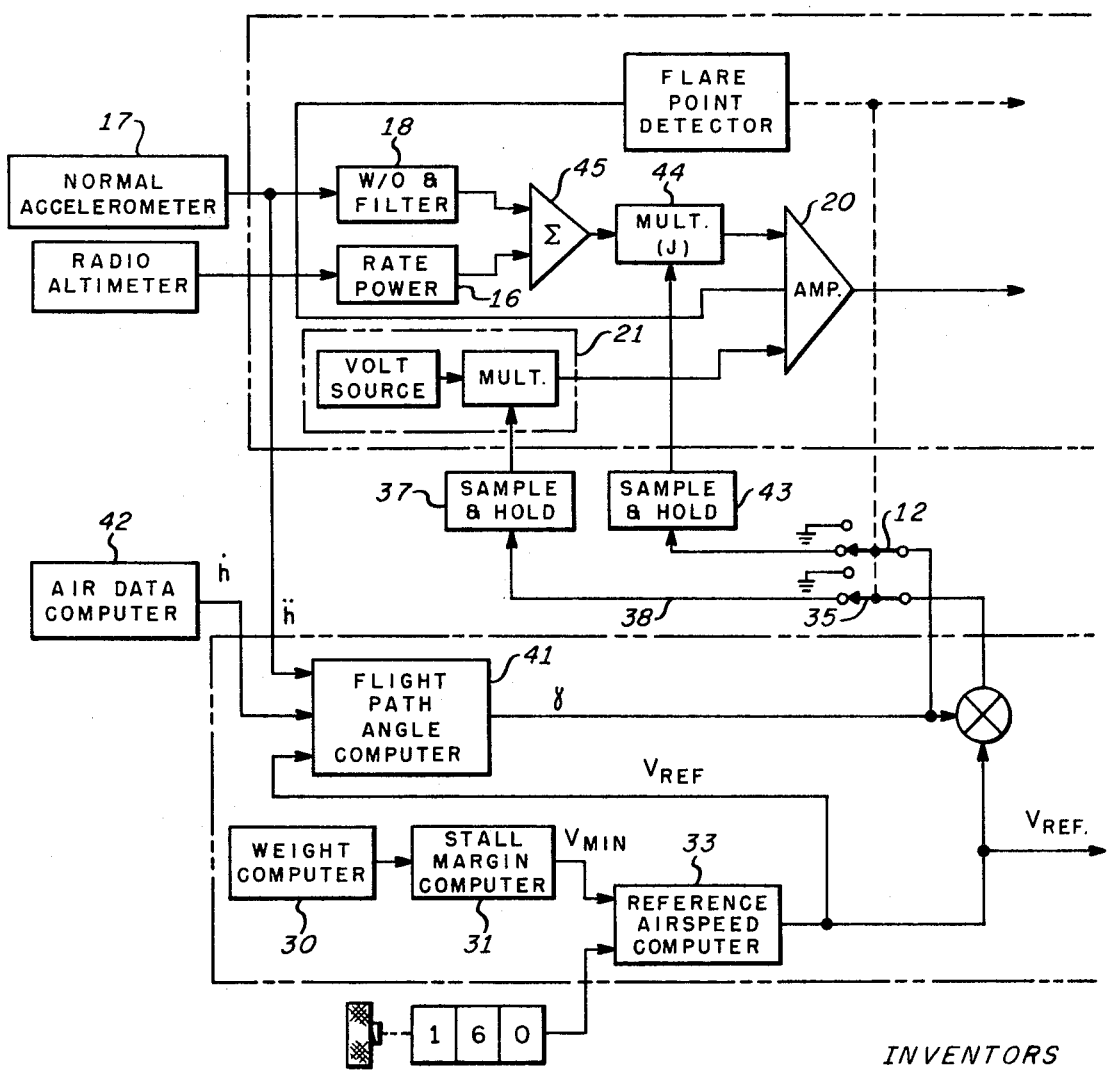
FIG. 3 is a schematic diagram of a suitable sample and hold circuit.

The foregoing may be accomplished by the apparatus illustrated schematically in FIG. 3. As shown therein, the flightpath angle term $\gamma$ is derived from a flight angle computer 41 which solves the above equation $\gamma = \sin^{-1} \dot{h}/V$ but wherein $\dot{h}$ term is derived from the complimentary mixing of long term $\dot{h}$ from an air data computer 42 and the high frequency components of $\dot{h}$ are derived from normal accelerometer 17 using the same general technique as used in FIG. 1. Also, it will be understood that the $V$ of the equation is not the instantaneous airspeed but is the reference airspeed derived from reference airspeed computer 33. An example of a flightpath angle computer applicable herein is illustrated schematically in the above-mentioned copending application.

The output of the flightpath angle computer 41 is supplied through switch 42 and sample and hold circuit 43 to a suitable variable gain device such as multiplier 44 connected in the $\dot{h}$ input to sum amplifier 20. In this embodiment of the invention the complemented $\dot{h}$ signal is derived in amplifier 45 and the gain of this signal is varied as a function of $\gamma$ by means of the multiplier 44; that is, the multiplier circuit 43 may be the same as that shown in FIG. 2. The output of the flightpath computer 41 is also summed with the reference airspeed $V_{REF}$ to vary the touchdown bias as a function of both $\gamma$ and $V_{REF}$. Thus, it will be evident that both the touchdown bias term $L$ and the flare time constant $J$ of the flare control law are varied in accordance with reference airspeed and flightpath angle and that this variation in the control law parameters is accomplished during the glide slope mode and prior to the predetermined fixed flare initiation point.

By adjusting the touchdown bias L as a function of reference airspeed and flightpath angle, and at the same time the time constant $J$ in accordance with airmass flightpath angle, the touchdown dispersion due to variations in glide slope beam angle and changes in headwinds (and windshear) will be greatly reduced even if the flare initiation point is a fixed altitude as is sometimes desired. Again this is evident from an inspection of FIG. 7, 8 and 9 which show a reduction of flare initiation point FP, spread when compared with the flare initiation points of FIGS. 5 and 6.

While the invention has been herein described with a certain degree of particularlity, and in connection with preferred embodiments thereof, it will be understood that many changes may be made in the details of construction and arrangement of components without departing from the spirit and scope of the invention as defined in the appended claims.

1. A landing control system for an aircraft having pitch control means for controlling the flightpath of the aircraft including a flare computer for supplying a solution of a predetermined flare control law including terms dependent upon the vertical position and movement of the craft relative to the ground and including at least one term defining a predetermined touchdown rate of descent and means for supplying a pitch command signal in accordance with an error in the solution of said flare control law, said system further including a flare point detector means responsive to a predetermined altitude above the runway for coupling said pitch command signal to said pitch control means whereby to cause the craft to follow said flarepath, wherein the improvement comprises:
   a. means responsive to predetermined conditions determinable at said aircraft and operable prior to said flare initiation point for varying said one control law term in accordance with at least one of said conditions whereby to vary said flarepath;
   b. and means responsive to said flare point detector means for maintaining the value of said one term at the value then obtaining.

2. A landing control system for an aircraft having pitch control means for controlling the flightpath of the aircraft and automatic throttle control means for controlling aircraft speed said system including a flare computer responsive to the vertical position and movement of the craft relative to the ground for defining a predetermined nominal flarepath and including at least one adjustable parameter for varying said flarepath from the nominal path and for supplying a pitch command signal adapted to cause the craft to follow said flarepath, and further including an airspeed computer including means for providing a throttle control command signal proportional to the differences between a measure of the actual approach airspeed of the craft and a measure of a reference speed and for supplying said throttle control signal to said throttle control means whereby to maintain craft airspeed at said reference airspeed wherein the improvement comprises:
   a. means operable prior to flare initiation for adjusting said one parameter in accordance with said reference airspeed measure whereby to vary said nominal flarepath in accordance with said reference airspeed, and b. means operable at flare initiation for supplying said pitch command signal to said pitch control means.

3. The apparatus as set forth in claim 2 wherein said one adjustable parameter determines a nominal finite rate of descent at touchdown.

4. The apparatus as set forth in claim 2 wherein said flarepath is an exponential path defined by the relation $J\dot{h} + h + L = 0$ where $h$ is the absolute altitude of the craft, $\dot{h}$ is the altitude rate and $L$ determines the finite touchdown rate and wherein said one adjustable parameter is $L$.

5. The apparatus as set forth in claim 4 wherein $J$ determines the flare time constant and further including means for providing a measure of the flightpath angle of the aircraft and means responsive thereto for adjusting the valve of $J$ and means responsive to said flightpath angle measure and said reference airspeed for adjusting the value of $L$.

6. The apparatus as set forth in claim 5 wherein the means for providing said flightpath angle measure comprises means for computing said flight path angle relative to the sustaining airmass.